(12) United States Patent
Krug et al.

(10) Patent No.: US 6,511,102 B2
(45) Date of Patent: Jan. 28, 2003

(54) PIPE CONNECTOR

(75) Inventors: Gerhard Krug, Duisburg (DE); Friedrich Lenze, Ratingen (DE); Erich Quadflieg, Krefeld (DE)

(73) Assignee: Vallourec Mannesmann Oil & Gas Germany GmbH, Düsseldorf (DE)

( * ) Notice: Subject to any disclaimer, the term of this patent is extended or adjusted under 35 U.S.C. 154(b) by 72 days.

(21) Appl. No.: 09/902,545

(22) Filed: Jul. 10, 2001

(65) Prior Publication Data

US 2002/0017788 A1 Feb. 14, 2002

Related U.S. Application Data

(63) Continuation of application No. PCT/DE00/03617, filed on Oct. 10, 2000.

(30) Foreign Application Priority Data

Nov. 10, 1999 (DE) .......................... 199 55 377

(51) Int. Cl.$^7$ .......................... F16L 25/00; F16L 35/00
(52) U.S. Cl. ...................... 285/333; 285/334; 285/390; 285/355
(58) Field of Search ................ 285/334, 333, 285/390, 355

(56) References Cited

U.S. PATENT DOCUMENTS 3,359,013 A * 12/1967 Knox et al. ................. 285/334
5,064,224 A * 11/1991 Tai ............................ 285/334

FOREIGN PATENT DOCUMENTS

| DE | 32 45 819 | | 6/1983 |
| GB | 2156933 A | * | 10/1985 |
| WO | WO 96 03605 | | 2/1996 |

* cited by examiner

Primary Examiner—Lynne H. Browne
Assistant Examiner—Aaron Dunwoody
(74) Attorney, Agent, or Firm—Henry M. Feiereisen

(57) ABSTRACT

A pipe connector having a pin element having a tapered outer threaded section between an external shoulder and a pin end face, a first threadless pin section between the external shoulder and the outer threaded section, and a second threadless pin section between the outer threaded section and the pin end face. Provided for threaded engagement with the pin element is a box element having a tapered inner threaded section between an internal shoulder and a box end face, a first threadless box section between the internal shoulder and the inner threaded section, and a second threadless box section between the inner threaded section and the box end face. Suitably, the second threadless pin section and the first threadless box section in the area of the internal joint is at least twice as long as the first threadless pin section and the second threadless box section in the area of the external joint.

24 Claims, 2 Drawing Sheets

PIPE CONNECTOR

CROSS-REFERENCES TO RELATED APPLICATIONS

This application is a continuation of prior filed copending PCT International application no. PCT/DE00/03617, filed Oct. 10, 2000.

This application claims the priority of German Patent Application Serial No. 199 55 377.7, filed Nov. 10, 1999.

BACKGROUND OF THE INVENTION

The present invention relates, in general, to pipe connectors, and more particularly to tool joints of a type having a pin element and a box element.

Offshore drilling for gas is carried out more and more into deeper water which have higher underground gas pressures. These drillings have to be serviced and repaired. However, no reliable tools, i.e. special drill pipes that can be screwed together to form a string of pipes, are commercially available. Changing drilling operations require a tool with a pipe connector to satisfy the following requirements:

high resistance against internal pressure and gasproof seal, indifferent and robust configuration for rough handling and multiple repeated use of the same tool, frequent torquing up, without loss of sealing function, withstand high torque and thus have high fatigue strength under changing bending stress and high torque withstanding abilities for workover operations, easy and quick assembly and disassembly, easy and cost-efficient repair works.

Currently, offshore/workover operations are carried out with larger, gastight tubing-thread connections which, although suitable to withstand the high inner gas pressures, are highly susceptible to repair because they cannot be repeatedly connected together. Thus such connections can be used only a few times and incur high costs. Moreover, such connections are not constructed for changing bending stresses necessarily encountered during offshore workover operations as a result of wake, current or vibrations caused by turbulence, so that a re-use is greatly diminished in view of the slight strength against changing bending stresses.

Other proposals includes the application of flange joints. Installation and dismantling of flange joints is, however, time-consuming and costly.

Normally, tool joints are used to join pipe members of a drill pipe, in particular tool joints with an internal shoulder and an external shoulder, because the configuration with dual joint areas is able to withstand high torque loading during threaded engagement and thus high operating torque. The tool joint is, however, gas permeable when higher gas pressures are involved. Although, it is known to employ an additional sealing ring made, e.g., of TEFLON material, to realize a seal against inner gas pressure, such a sealing ring can be re-used only to a limited extent and is suitable only for lower pressures (company leaflet—Mannesmann OCTG—"Premium Test Drill Pipe for high pressure oil and gas wells", no. 2, 1989).

International patent publication WO 96/03605 describes a pipe connection in the form of a tool joint. The drill pipe is made of a string of individual pipe members which are secured together by a threaded connection, called tool joint. Each individual drill pipe member includes a pin element at one end and a box element at the other end, so that successive individual members can be threaded to one another via the tool joint by the threaded engagement of confronting pin and box elements. The pin element has a tapered outer threaded section extending between an external shoulder and a pin end face, and a threadless section between the external shoulder and the outer threaded section as well as between the outer threaded section and the pin end face. Mating with the pin element of one pipe member is the box element of another pipe, whereby the box element has a tapered inner threaded section between an internal shoulder and a box end face and a threadless section between the internal shoulder and the inner threaded section as well as between the inner threaded section and the box end face. When screwed together, the confronting threadless sections of the pin and box elements in the area of the external shoulder are longer than the confronting threadless sections of the pin and box elements in the area of the internal shoulder. The external shoulder contacting the box end face during threaded engagement constitutes hereby the primary shoulder.

A comparable pipe connector is described in German Pat. No. DE 32 45 819 B1. The pipe connector is also configured as tool joint for drill pipes and has a similar configuration as the tool joint disclosed in international patent publication WO 96/03605, with the external shoulder representing the primary shoulder which is first activated during threaded connection. The length of the threadless sections in the area of the external shoulder is also greater than the threadless sections in the area of the internal shoulder. In addition, it is proposed to make the distance of the box end face from the internal shoulder greater than the distance of the pin end face to the external shoulder to thereby realize a gap, when the box end face bears against the external shoulder during threaded connection.

The pipe connectors as described in International patent publication WO 96/03605 and German Pat. No. DE 32 45 819 B1 have shortcomings because they are unable to meet the requirements that are demanded of pipe connectors for use in offshore/workover operations, and include high gasproof seals to withstand internal pressures of>10,000 psi, high strength under changing bending loads, ruggedness in handling and frequent reusability, without adverse affect on the seal, as well as quick assembly and disassembly and easy and cost-efficient service work.

It would therefore be desirable and advantageous to provide an improved pipe connector which obviates prior art shortcomings and is also suitable for use in offshore/workover operations.

SUMMARY OF THE INVENTION

The present invention resolves prior art problems by providing a pipe connector, which includes a pin element having a tapered outer threaded section between an external shoulder and a pin end face, a first threadless pin section between the external shoulder and the outer threaded section, and a second threadless pin section between the outer threaded section and the pin end face; and a box element configured for threaded engagement with the pin element and having a tapered inner threaded section between an internal shoulder and a box end face, a first threadless box section between the internal shoulder and the inner threaded section, and a second threadless box section between the inner threaded section and the box end face, wherein, at threaded engagement of the box and pin elements, the first threadless pin section and the second threadless box section confront one another in the area of the internal shoulder and are defined by a first length, and the first threadless box section and the second threadless pin section confront one another in the area of the external shoulder and are defined by a second length which differs from the first length, wherein the external shoulder of the pin element forms a primary shoulder, when abutting the box end face during threaded engagement of the pin and box elements, wherein the pin end face is spaced from the external shoulder at a distance which is smaller than a distance between the box end face and the internal shoulder of the box element, wherein the first threadless box section and the second threadless pin section are at least twice as long as the second threadless box section and the first threadless pin section, wherein the second threadless pin section has a first region adjacent the pin end face, wherein the first threadless box section includes a groove and a sealing member, with the first region of the second threadless pin section abutting the sealing member, when the pin and box elements are threadably engaged, to thereby provide a metallic seal, wherein the sealing member includes first and second contact surfaces in axial spaced-apart relationship, wherein the first contact surface is disposed proximal to the internal shoulder and provides a seal seat, wherein the second contact surface is disposed distal to the internal shoulder and provides a support function, wherein the groove of the first threadless box section provides an increased elasticity and is arranged between the inner threaded section of the box element and the sealing member.

High torque loading is absorbed by also employing dual joint areas, i.e. external joint area (primary joint area) and internal joint area (secondary joint area); however, in order to additionally limit the load of the secondary effective internal joint area, the pin element has a long threadless section which carries a component of the metallic seal. In the following description, the "threadless nose section of the pin element at the internal joint area" will also be denoted as "lip" or "sealing lip". The length of the lip is at least twice as long, preferably three times as long, as the threadless section adjacent the external shoulder. In this way, as the tool joint is increasingly torqued up, the external shoulder is proportionally under more stress whereas axial pressure loads in the lip, which reduce the strength against internal pressure, are kept low. The risk of flexure which may be accompanied by an adverse affect on the sealing function as a consequence of the extension in length of the lip can be counteracted by the provision of a support contact which reduces the flexure to an insignificant level.

For increasing the elasticity between the threaded section and the sealing zone, the box element has the groove which does not assume the function of a relief groove to decrease stress peaks, but primarily is provided to make this area more elastic to reduce the compression in the lip. In addition, the groove serves as reservoir for excess grease escaping from the threads, without adversely affecting the sealing system. The groove is so sized to allow use of chasers for implementing an effective process for fabricating the thread.

According to another feature of the present invention, the second threadless pin section has a slanted straight contact surface for interaction with the two contact surfaces of the sealing member, wherein the two contact surfaces of the box element have a convex, bulbed configuration. Through suitable selection of the radii of the bulbed contact surfaces of the box element as well as an optimization of the mutually influencing distances of the seal seat forming contact surface from the joint area and from the support-forming contact surface, it is ensured that in the seal seat a sufficient degree of constant surface pressure is effected which is substantially independent from fabrication tolerances of the overlap as well as from length differences between pin and box elements, and that fluctuations in the support-forming contact surface are absorbed. As an alternative, the bulbed contact surfaces may also be formed in the threadless section of the pin element, confronting the internal shoulder of the box element. In this case, the threadless section of the box element, cooperating with the bulbed contact surfaces, is configured with a straight, inclined surface.

Calculations and analyses have shown that the desired results have been attained, when selecting the parameters as follows.
a) The radius $R_D$ of the sealing contact surface is at least 1.25 times the mean radius $R_L$ of the sealing lip of the pin element.
b) The radius $R_S$ of the support-forming contact surface is about twice the radius $R_D$.
c) The box and pin elements have a diametrical difference, wherein the contact surfaces of the box element define an overmeasure which is dependent on a material of the box and pin elements, wherein the overmeasure $U_D$ in the sealing contact surface is governed by the equation:

$$U_D = z1 \times R_L \times \sigma 0.2/E,$$

wherein $z1=1.6 \ldots 2.4$, $\sigma 0.2$ is the yield point, E is the modulus of elasticity.
d) The overmeasure $U_S$ in the support-forming contact surface is governed by the equation:

$$U_S = z2 \times U_D$$

wherein $z2=0.5 \ldots 0.7$.

The sealing contact surface is spaced at a distance $L_{ID}$ from the internal shoulder of the box and is governed by the equation:

$$L_{ID} = z3 \times U_D \times \sqrt{R_L/S_L}$$

wherein $z3=1.2 \ldots 1.5$, $S_L$ is a mean thickness of the sealing lip.
f) The sealing contact surface is spaced at a distance $L_{DS}$ from the support-forming contact surface, and is governed by the equation:

$$L_{DS} = z4 \times \sqrt{R_L \times S_L}$$

wherein $z3=0.5 \ldots 0.8$.
g) The support-forming contact surface is spaced at a distance $L_{SG}$ from an entry point of the outer threaded section, and is governed by the equation:

$$L_{SG} = z5 \times L_D$$

wherein $z5=1.5 \ldots 2.0$.
f) The sealing contact surface is spaced at a distance $L_{DS}$ from the support-forming contact surface, and is governed by the equation:

$$L_{DS} = z4 \times \sqrt{R_L \times S_L}$$

wherein $z4=0.5 \ldots 0.8$.

According to another feature of the present invention, the internal shoulder is configured as 90° shoulder. This is advantageous because generation of radial forces is prevented during compression, which would have an adverse effect on the sealing system.

BRIEF DESCRIPTION OF THE DRAWING

Other features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Figure 1:
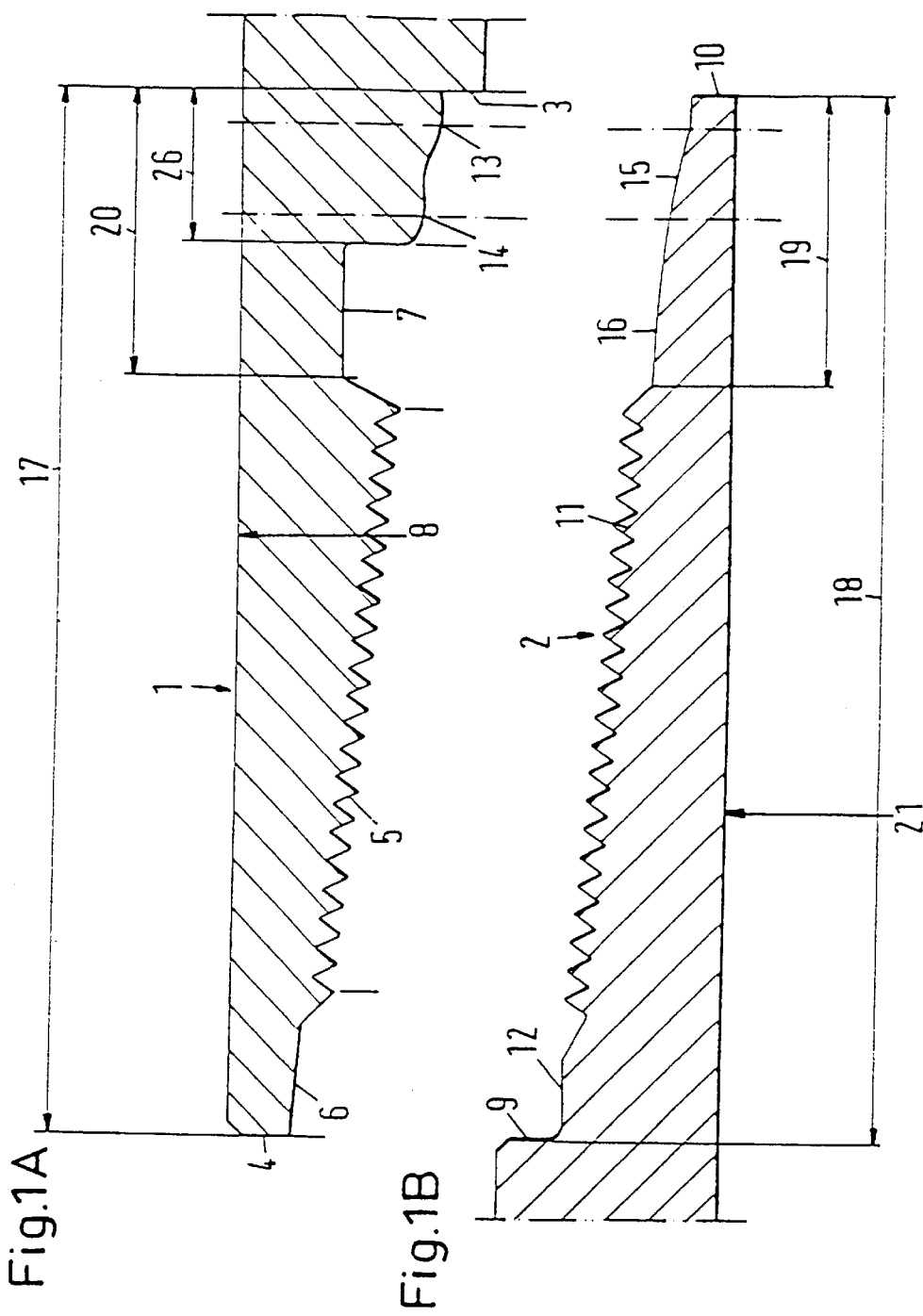
FIG. 1A is a longitudinal section of one half of a box element according to the present invention forming one component of a tool joint.
FIG. 1B is a longitudinal section of one half of a pin element according to the present invention forming another component of the tool joint.

Throughout all the Figures, same or corresponding elements are generally indicated by same reference numerals.

Turning now to the drawing, and in particular to FIG. 1A, there is shown a longitudinal section of one half of a box element according to the present invention, generally designated by reference numeral 1 and forming one component of a tool joint for coupling individual pipe members of a drill pipe, not shown. The box element 1 is intended for mating connection to a pin element, generally designated by reference numeral 2 and shown in FIG. 1B. The pin element 2 forms the other component of the tool joint. It will be understood that the pipe members of the drill pipe have each a box element 1 on one axial end and a pin element 2 on the opposite axial end to thereby allow connection of a string of pipe members to a drill pipe, whereby the box element 1 of one pipe member is intended for mating connection with the pin element 2 of another pipe. This type of pipe connection is known as tool joint.

The box element 1 is formed with a tapered cylindrical threadless counterbore section 6 extending inwardly from a box end face 4. The counterbore section 6 terminates in the beginning of a tapered inner threaded section 5 which in turn ends in a base section 20 which is cylindrical and does not contain any threads. The base section 20 terminates in an internal annular shoulder 3, which is configured as a 90° shoulder, as shown. Arrow 8 designates the outer diameter of the box element 1.

The pin element 2 configured for mating connection with the box element 1 includes a threadless cylindrical tapered pin nose section 19, also denoted "sealing lip", which extends inwardly from a pin end face 10 and terminates in the beginning of a tapered outer threaded section 11. The outer threaded section 11 terminates in a base section 12 which is cylindrical and does not contain any threads. The base section 12 terminates in an internal annular shoulder 9 which may be beveled, as shown. When the tool joint is sufficiently torqued up, the external shoulder 9, as primary shoulder, abuts the box end face 4, whereas the pin nose section 19 is received by the box base section 20, with the internal shoulder 3, as secondary shoulder, abutting the pin end face 10. Arrow 21 designates the inner diameter of the pin element 2.

In accordance with the present invention, the box base section 20 is divided in a sealing member 26 and a groove 7 which extends from the end of the inner threaded section 5 to the beginning of the sealing member 26. As shown in FIG. 1A, the sealing member 26 has an undulated configuration to define two distinct contact surfaces 13, 14 of convex, bulbed shape. The contact surface 13 extends outwardly of the inner shoulder 3 and provides a seal seat whereas the contact surface 14, which extends outwardly of the contact surface 13 and terminates in the groove 7, provides a support-forming surface. Each of the contact surfaces 13, 14 of the box element 1 is defined by a radius which is greater than a mean radius of the nose section 19 of the pin element 2, wherein the radius of the contact surface 13 is always smaller than the radius of the contact surface 14. Suitably, the radius of the contact surface 13 is at least 1.25 times the mean radius of the nose section 19, and the radius of the contact surface 14 is about twice the radius of the first contact surface.

The seal seat forming contact surface 13 and the support-forming contact surface 14 interact with a straight conical surface 15 of the threadless nose section 19 of the pin element 2, when making up the tool joint. The conical surface 15 has a steep inclination, preferably at 1:4, and terminates in the direction of the outer threaded section 11 in a conical surface 16 of flatter inclination, preferably at an inclination of 1:6. As a consequence of the difference in inclination, the conical surface 16 serves as transition surface to protect the seal seat forming contact surface 13 against damage. The inclination of the conical surface 16 corresponds, preferably, to the inclination of the inner threaded section 5 and of the outer threaded section 11.

The external shoulder 9 of the pin element 2 forms the primary shoulder which is first activated when the tool joint is torqued up. This is realized by configuring the distance 17 between the internal shoulder 3 and the box end face 4 greater than the distance 18 between the external shoulder 9 and the pin end face 10.

As further shown in FIGS. 1A and 1B, the threadless nose section 19 of the pin element 2 in the area of the inner joint area is at least twice as long, preferably three times as long, as the threadless counterbore section 6 of the box element 1 in the area of the outer joint area.

Figure 2:
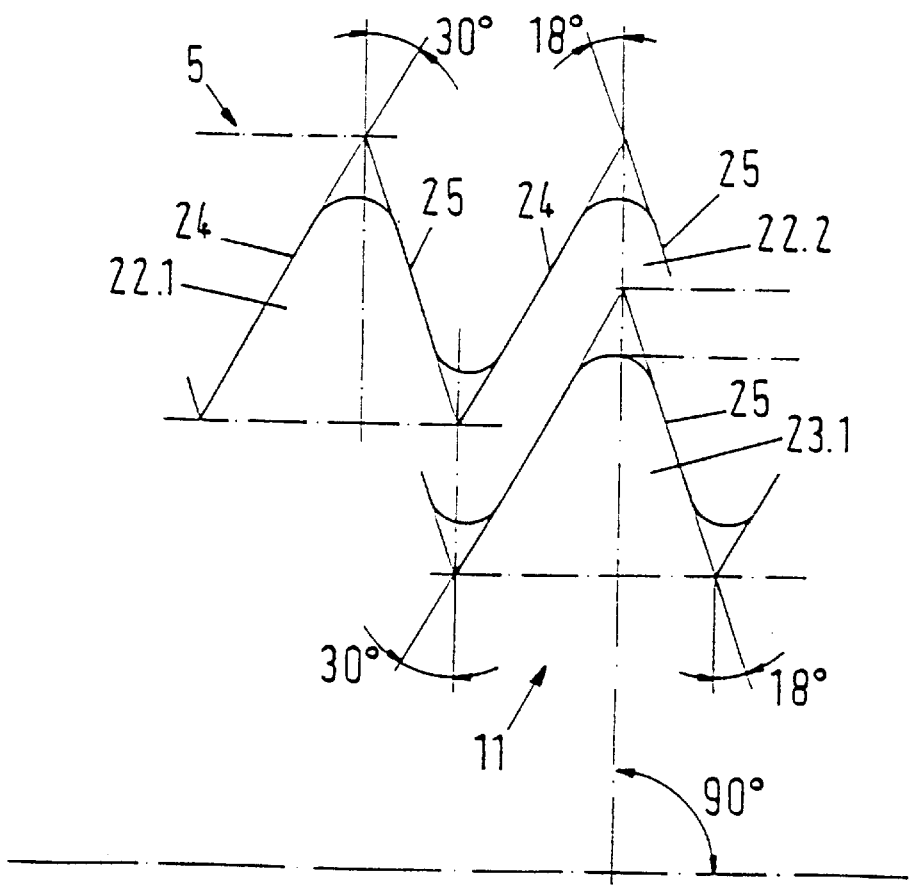
FIG. 2 is an enlarged detailed view of a thread configuration in accordance with the present invention.

Turning now to FIG. 2, there is shown an enlarged detailed view of a thread configuration in accordance with the present invention. The upper part of FIG. 2 shows a cutaway view of 1½ threads 22.1, 22.2 of the inner threaded section 5 of the box element 1, whereas the lower part shows a cutaway view of a thread 23.1 of the outer threaded section 11 of the pin element 2. The basic configuration of both threaded sections 5, 11 is a coarse round thread according to A.P.I. standard (American Petroleum Institute), which has benefits for a desired, repeated threaded connection, which may range up to 100 times and more and is suitable for a quick threading and stabbing of the pin element 2 and the box element 1. The threads 22.1, 22.2 have a guide face 24, which has an angle of 30° in correspondence to the A.P.I. rotary thread, and a load face 25, which, deviating from A.P.I., is steeper and in a range from 15° to 20°, preferably 18°. The same is true for the threads 23.1 of the outer threaded section 11 of the pin element 2.

While the invention has been illustrated and described as embodied in a pipe connection, it is not intended to be limited to the details shown since various modifications and structural changes may be made without departing in any way from the spirit of the present invention.

What is claimed as new and desired to be protected by Letters Patent is set forth in the appended claims:

1. A pipe connector, comprising:
   a pin element having a tapered outer threaded section between an external shoulder and a pin end face, a first threadless pin section between the external shoulder and the outer threaded section, and a second threadless pin section between the outer threaded section and the pin end face; and a box element configured for threaded engagement with the pin element and having a tapered inner threaded section between an internal shoulder and a box end face, a first threadless box section between the internal shoulder and the inner threaded section, and a second threadless box section between the inner threaded section and the box end face, wherein, at threaded engagement of the box and pin elements, the first threadless pin section and the second threadless box section confront one another in the area of the internal shoulder and are defined by a first length, and the first threadless box section and the second threadless pin section confront one another in the area of the external shoulder and are defined by a second length which differs from the first length, wherein the external shoulder of the pin element forms a primary shoulder, when abutting the box end face during threaded engagement of the pin and box elements, wherein the pin end face is spaced from the external shoulder at a distance which is smaller than a distance between the box end face and the internal shoulder of the box element, wherein the first threadless box section and the second threadless pin section are at least twice as long as the second threadless box section and the first threadless pin section, wherein the second threadless pin section has a first region adjacent the pin end face, wherein the first threadless box section includes a groove and a sealing member, with the first region of the second threadless pin section abutting the sealing member, when the pin and box elements are threadably engaged, to thereby provide a metallic seal, wherein the sealing member includes first and second contact surfaces in axial spaced-apart relationship, wherein the first contact surface is disposed proximal to the internal shoulder and provides a seal seat, wherein the second contact surface is disposed distal to the internal shoulder and provides a support function, wherein the groove of the first threadless box section provides an increased elasticity and is arranged between the inner threaded section of the box element and the sealing member.

2. The pipe connector of claim 1, wherein the first threadless box section and the second threadless pin section are three times as long as the second threadless box section and the first threadless pin section.

3. The pipe connector of claim 1, wherein the inner threaded section and the outer threaded section are provided wits a coarse standard thread having a load face and a guide face, wherein the load face has a minimum angle of 15°, wherein the load face has a maximum angle of 20°, wherein the guide face has an angle of 30°.

4. The pipe connector of claim 3, wherein the load face has an angle of 18°.

5. The pipe connector of claim 3, wherein the inner threaded section and the outer threaded section are defined by a pitch of at least 2.5 thread/inch, wherein the inner threaded section and the outer threaded section are defined by a pitch of at most 4 thread/inch.

6. The pipe connector of claim 5, wherein the pitch is 3 thread/inch.

7. The pipe connector of claim 3, wherein the inner threaded section and the outer threaded section are tapered to define a cone of at least 1:4, wherein the inner threaded section and the outer threaded section are tapered to define a cone of at most 1:8.

8. The pipe connector of claim 7, wherein the cone of the inner threaded section and the outer threaded section is 1:6.

9. The pipe connector of claim 1, wherein the second threadless pin section has a slanted straight contact surface for interaction with the first and second contact surfaces of the sealing member, wherein the first and second contact surfaces of the box element have each a convex, bulbed configuration.

10. The pipe connector of claim 9, wherein each of the first and second contact surfaces is defined by a radius which is greater than a mean radius of the second threadless pin section, wherein the radius of the first contact surface is smaller than the radius of the second contact surface.

11. The pipe connector of claim 10, wherein the radius of the first contact surface is greater by at least 1.25 times than the mean radius of the second threadless pin section.

12. The pipe connector of claim 10, wherein the radius of the second contact surface is about twice as long the radius of the first contact surface.

13. The pipe connector of claim 1, wherein the box and pin elements have a diametrical difference, wherein the first and second contact surfaces of the box element define an overmeasure which is dependent on a material of the box and pin elements, wherein the overmeasure in the second contact surface is smaller than the overmeasure in the first contact surface.

14. The pipe connector of claim 13, wherein the overmeasure in the first contact surface is governed by the equation:

$$U_D = z1 \times R_L \times \sigma 0.2/E,$$

wherein $U_D$ is the overmeasure in the first contact surface, $z1 = 1 \ldots 2.4$, $R_L$ is a mean radius of the second threadless pin section, $\sigma 0.2$ is yield point, E is the modulus of elasticity.

15. The pipe connector of claim 13, wherein the overmeasure in the second contact surface is governed by the equation:

$$U_S = z2 \times U_D$$

wherein $U_S$ is the overmeasure in the second contact surface, $U_D$ is the overmeasure in the first contact surface, $z2 = 0.5 \ldots 0.7$.

16. The pipe connector of claim 1, wherein the first contact surface is spaced at a distance from the internal shoulder of the box and is governed by the equation:

$$L_{ID} = z3 \times U_D \times \sqrt{R_L/S_L}$$

wherein $L_{ID}$ is the distance between internal shoulder and first contact surface, $z3 = 1.2 \ldots 1.5$, $U_D$ is the overmeasure in the first contact surface, $R_L$ is a mean radius of the second threadless pin section, $S_L$ is a mean thickness of the second threadless pin section.

17. The pipe connector of claim 1, wherein the first contact surface is spaced at a distance from the second contact surface, and is governed by the equation:

$$L_{DS} = z4 \times \sqrt{R_L \times S_L}$$

wherein $L_{DS}$ is the distance between first contact surface from the second contact surface, z4=0.5 ... 0.8, $R_L$ is a mean radius of the second threadless pin section, $S_L$ is a mean thickness of the second threadless pin section.

18. The pipe connector of claim 1, wherein the second contact surface is spaced at a distance from an entry point into the outer threaded section, and is governed by the equation:

$$L_{SG}=z5 \times L_{DS}$$

wherein $L_{SG}$ is the distance between second contact surface and the entry point of the outer threaded section, $L_{DS}$ is the distance between the first contact surface from the second contact surface,

Z5=1.5 ... 2.0.

19. The pipe connector of claim 9, wherein the straight contact surface of the second threadless pin section has a taper at an inclination in a range between 1:3 and 1:5, and terminates in an inclination which corresponds to an inclination of the outer threaded section.

20. The pipe connector of claim 19, wherein the inclination of the taper of the straight contact surface is 1:4.

21. The pipe connector of claim 1, wherein the internal shoulder is configured as 90° shoulder.

22. A tool joint for coupling successive pipe members of a drill pipe for use in offshore/workover operation, said tool joint comprising:

a pin element, provided on one pipe member and having an outer thread section, which extends between a first threadless pin section adjacent an external shoulder and a second threadless pin section adjacent a pin end face;

a box element, provided on another pipe member, for mating connection with the pin element, said box element having an inner thread section, extending between a first threadless box section adjacent an internal shoulder and a second threadless box section adjacent a box end face, wherein the second threadless pin section is at least twice as long as the first threadless pin section, wherein the first threadless box section is at least twice as long as the second threadless box section, wherein one of the first threadless box section and second threadless pin section has a tapered undulated contact surface to define a seal seat and a support zone, wherein the other one of the first threadless box section and second threadless pin section has a tapered straight contact surface.

23. The tool joint of claim 22, wherein the second threadless pin section is three times as long as the first threadless pin section, and wherein the first threadless box section is three times as long as the second threadless box section.

24. The tool joint of claim 22, wherein the first threadless box section has a groove between the undulated contact surface and the inner thread section to provide elasticity.

* * * * *

UNITED STATES PATENT AND TRADEMARK OFFICE
CERTIFICATE OF CORRECTION

PATENT NO. : 6,511,102 B2
DATED : January 28, 2003
INVENTOR(S) : Gerhard Krug, Friedrich Lenze and Erich Quadflieg It is certified that error appears in the above-identified patent and that said Letters Patent is hereby corrected as shown below:

<u>Column 7,</u>
Line 50, insert -- with -- instead of "wits"

<u>Column 8,</u>
Line 35, replace "z1=1 ... 2.4" with -- z1=1.6 ... 2.4 --

Signed and Sealed this

Fifth Day of August, 2003

JAMES E. ROGAN
*Director of the United States Patent and Trademark Office*